United States Patent
Ortel et al.

(10) Patent No.: US 10,886,595 B1
(45) Date of Patent: Jan. 5, 2021

(54) OUTDOOR WI-FI BOLLARD

(71) Applicant: TESSCO Communications Incorporated, Hunt Valley, MD (US)

(72) Inventors: Timothy Ortel, Monkton, MD (US); Stephen Powell, Baltimore, MD (US); Mike Parry, San Antonio, TX (US); Dennis Burrell, Cedar Park, TX (US)

(73) Assignee: TESSCO COMMUNICATIONS INCORPORATED, Hunt Valley, MD (US)

(*) Notice: Subject to any disclaimer, the term of this patent is extended or adjusted under 35 U.S.C. 154(b) by 259 days.

(21) Appl. No.: 15/993,122

(22) Filed: May 30, 2018

Related U.S. Application Data

(63) Continuation-in-part of application No. 15/017,122, filed on Feb. 5, 2016, now Pat. No. 10,249,932.

(51) Int. Cl.
| | |
|---|---|
| *H01Q 1/22* | (2006.01) |
| *H01Q 1/42* | (2006.01) |
| *H01Q 1/44* | (2006.01) |
| *H04W 88/08* | (2009.01) |

(52) U.S. Cl.
CPC ............ *H01Q 1/2291* (2013.01); *H01Q 1/42* (2013.01); *H01Q 1/44* (2013.01); *H04W 88/08* (2013.01)

(58) Field of Classification Search
CPC .......... H01Q 1/2291; H01Q 1/44; H01Q 1/42; H04W 88/08
See application file for complete search history.

(56) References Cited

U.S. PATENT DOCUMENTS

| | | | |
|---|---|---|---|
| 5,757,324 | A | 5/1998 | Helms et al. |
| 6,222,503 | B1 | 4/2001 | Gietema et al. |
| 6,388,622 | B1 | 5/2002 | Jennetti et al. |
| 7,036,734 | B2 | 5/2006 | Baker |
| 8,203,501 | B2 | 6/2012 | Kim |

(Continued)

FOREIGN PATENT DOCUMENTS

| | | |
|---|---|---|
| CN | 2779630 Y | 5/2006 |
| CN | 202050047 U | 11/2011 |

(Continued)

OTHER PUBLICATIONS

Oberon, Model 3030, 12.5 In. Diameter Netpost Heavy duty Fiberglass Wifi; Access Point Bollard/Standard Style/ black/57 in. Height; 2 pgs.

(Continued)

*Primary Examiner* — Dimary S Lopez Cruz
*Assistant Examiner* — Michael M Bouizza
(74) *Attorney, Agent, or Firm* — Shlesinger, Arkwright & Garvey LLP

(57) ABSTRACT

An outdoor Wi-Fi bollard includes a bollard housing having a vertical tube with a vertical wall and top and bottom openings and a cap disposed over the top opening; a base disposed at the bottom opening; first and second vertical members inside the housing and extending adjacent the wall from the base to the top opening, the first and second vertical members including first and second lower ends, respectively, operably attached to the base; and a first brace attached to the first and second upper ends, the first and second vertical members including first and second upper ends, respectively, operably attached to the first brace.

20 Claims, 10 Drawing Sheets

(56) References Cited

U.S. PATENT DOCUMENTS

| | | |
|---|---|---|
| 8,416,059 B1 | 4/2013 | Rambadl et al. |
| 8,836,607 B2 | 9/2014 | Cook |
| 9,726,360 B1 | 8/2017 | Alexander |
| 2004/0219924 A1 | 11/2004 | Flynn |
| 2010/0237798 A1 | 9/2010 | Wolf |
| 2012/0143383 A1 | 6/2012 | Cooperrider et al. |
| 2014/0240193 A1 | 8/2014 | Caldwell et al. |
| 2015/0002361 A1 | 1/2015 | Pu |
| 2015/0035704 A1 | 2/2015 | Schwengler et al. |
| 2017/0111521 A1* | 4/2017 | Bowers ................. H04W 12/08 |

FOREIGN PATENT DOCUMENTS

| | | |
|---|---|---|
| JP | 2008211391 A | 9/2008 |
| WO | WO 2014199089 A1 | 12/2014 |

OTHER PUBLICATIONS

Oberon Mounting Solutions for Wifi Access Point; Installation Guide Model 3030; 2 pgs.

\* cited by examiner

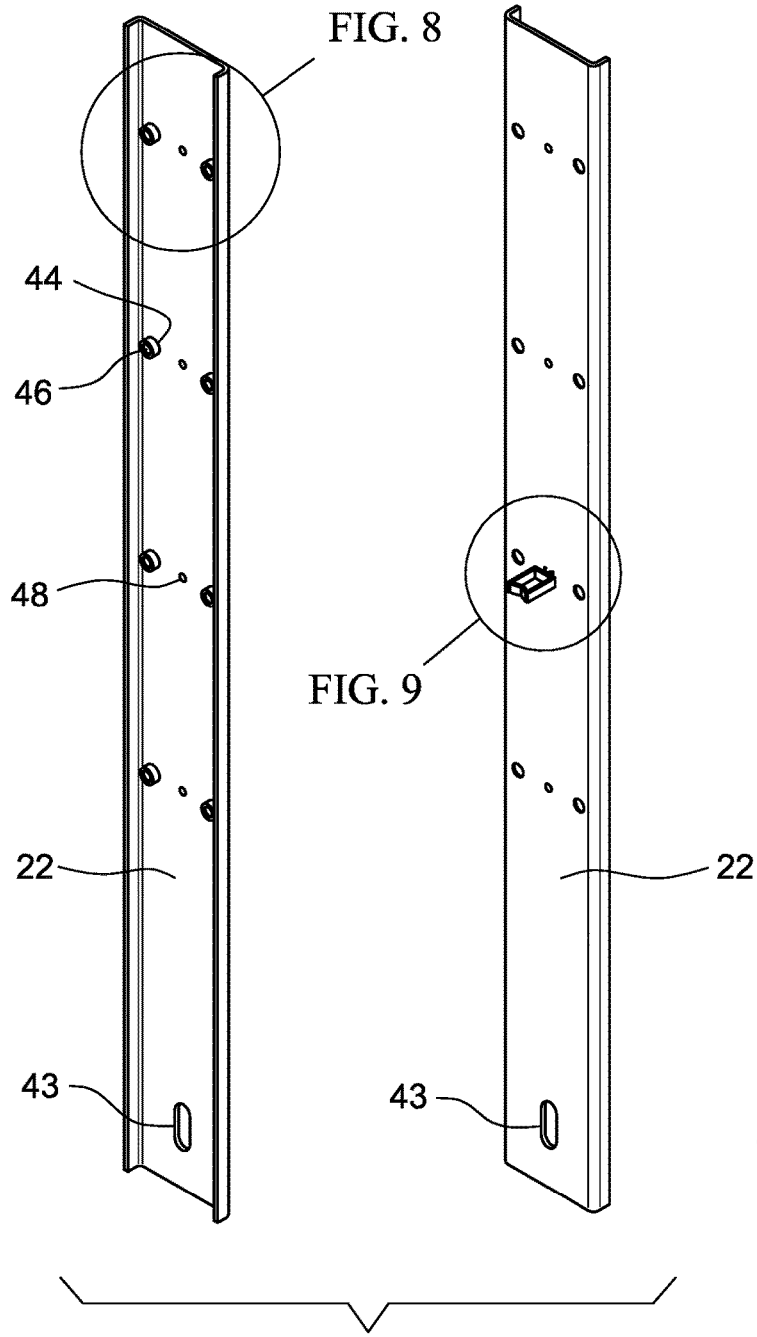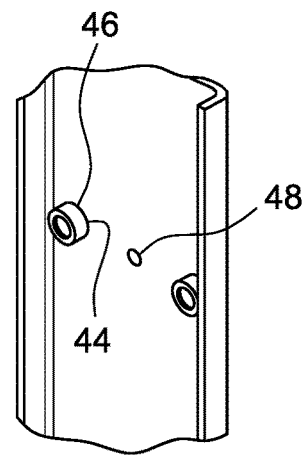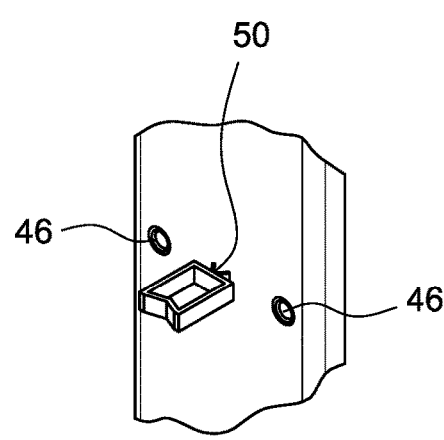
FIG. 7
FIG. 8
FIG. 9

US 10,886,595 B1

OUTDOOR WI-FI BOLLARD

RELATED APPLICATION

This is continuation-in-part of application Ser. No. 15/017,122, filed Feb. 5, 2016, hereby incorporated by reference.

FIELD OF THE INVENTION

The present invention is generally directed to an outdoor enclosure which protects and allows the mounting of equipment required to provide Wi-Fi in open outdoor areas from weather and public contact and in particular to a bollard structure with interior space protected from the weather for housing Wi-Fi equipment.

BACKGROUND OF THE INVENTION

College campuses, parks, and other open areas where people frequent now require Wi-Fi coverage. Typical mounting solutions for Wi-Fi equipment are towers, light poles or buildings. In the open area mentioned, typical mounting structures are not available or would detract from the appearance of the area. By creating an enclosure in the shape of a typical bollard found in these areas used for parking or lighting, Wi-Fi equipment can be installed while blending into the surroundings.

SUMMARY OF THE INVENTION

The present invention provides an outdoor Wi-Fi bollard, comprising a bollard housing having a vertical tube with a vertical wall and top and bottom openings and a cap disposed over the top opening; a base disposed at the bottom opening; first and second vertical members inside the housing and extending adjacent the wall from the base to the top opening, the first and second vertical members including first and second lower ends, respectively, operably attached to the base; and a first brace attached to the first and second upper ends, the first and second vertical members including first and second upper ends, respectively, operably attached to the first brace.

The present invention also provides an outdoor Wi-fi bollard, comprising one-piece welded metal frame or plastic frame that provides a rigid frame for mounting equipment and resists a transverse force applied to the bollard to prevent the bollard from being tipped over.

BRIEF DESCRIPTION OF THE DRAWINGS

FIG. 7 is a perspective view of a pair of vertical members shown in FIG. 1.

FIG. 8 is an enlarged view of a section taken from FIG. 7.

FIG. 9 is an enlarged view of a section taken from FIG. 8.

DETAILED DESCRIPTION OF THE INVENTION

Figure 1:
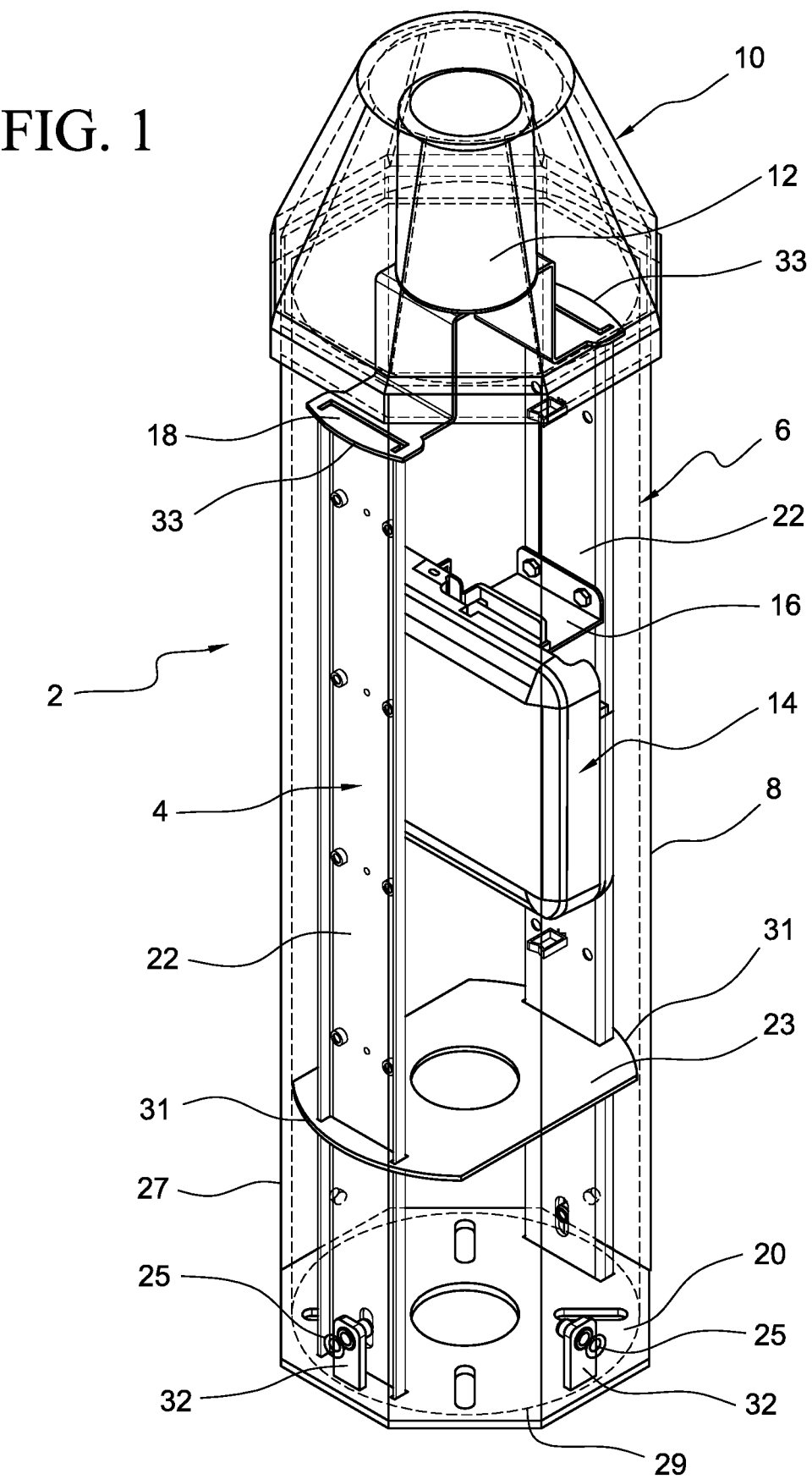
FIG. 1 is a perspective of a Wi-Fi bollard embodying the present invention, showing an internal frame.

Referring to FIG. 1, an outdoor Wi-Fi bollard assembly 2, embodying the present invention, is disclosed. The assembly 2 consists of a frame 4, preferably made of welded aluminum or plastic, an outer housing 6 in the shape and size of a typical bollard, preferably made of plastic. The bollard housing 6 includes a tube 8, preferably octagonal in cross-section and made of pultruded fiberglass and a cap 10, preferably made of polycarbonate, an antenna 12 and a wireless access point radio 14. The antenna 12 may be omnidirectional.

An example of the antenna 12 is TerraWave 2.4/5 GHz 6 dbi 4" outdoor Multiple-Input and Multiple-Output (MIMO), Model M060060M1D43602C, available from Ventev. A mounting bracket 16 for the access point radio 14 is operably attached to the frame 4. An example of the access point radio 14 is Cisco 3802e. The antenna 12 is operably connected to the access point radio 14, which is connected to the network. The access point radio 14 may include an internal antenna, such as Cisco 1572IC, in which case the separate antenna 12 is not used.

Bollard refers to a type of architectural structure, typically short, upright and mounted on the ground installed along walkways, pathways, steps, etc. A bollard is a short post used to define a boundary or pathway to provide a visual guide for pedestrians or vehicle traffic. In landscaping, decorative bollards are used to define distinct pedestrian areas. Bollards can be used anywhere to define areas and mark paths and when lighted to illuminate a pedestrian pathway at night.

A wireless access point radio is a networking hardware device that allows a Wi-Fi device to connect to a wired network. The access point radio usually connects to a router (via a wired network) as a standalone device, but it can also be an integral component of the router itself. An access point radio connects directly to a wired local area network, typically Ethernet, and the access point radio then provides wireless connections using wireless LAN technology, typically Wi-Fi, for other devices to utilize that wired connection.

The tube 8 and the cap 10 can be any shape, depending on the aesthetics of the environment. An octagonal shape for the tube 8 and a truncated pyramid shape with a circular convex top portion 11 for the cap 10 are shown, but any shape for the tube or the cap can be used. The pultruded engineered fiberglass tube 8 provides a durable housing that will withstand impacts and weather. The thermoformed polycarbonate cap 10 seals the top of the tube 8 and provides a rugged RF transparent housing for the antenna 12.

The frame 4 has a mounting bracket 18 for carrying the antenna 12. The frame 4 has a base plate 20 operably attached to a pair of vertical members 22. The vertical members 22 are advantageously positioned on the outer edge portions of the base plate 20, preferably diametrically opposite each other with respect to the base, to provide an abundance of internal space for future placement of other equipment, cables, etc. inside the housing 6. The mounting bracket 18 is operably attached to the upper ends of the vertical members 22. A cross-section plate 23 is attached to the vertical members 22 between the bottom end portions and the top end portions of the of the vertical members 22. Bolts 25 attach the housing 6 to the frame 4. The bolts 25 are preferably standard security-type bolts with tamper resistant heads.

The tube 8 has a wall 27 with a circular inner surface 27 that contacts the outer edges of the cross-section plate 23 and the mounting bracket 18 so that any side force that is applied to the housing 6 is effectively transferred to the frame 4 and to the foundation to which the frame 4 is attached. The frame 4, being of one-piece construction, provides a rigid support to the housing 6 and prevents it from tipping over even is a force is applied transversely to the top.

Figure 2:
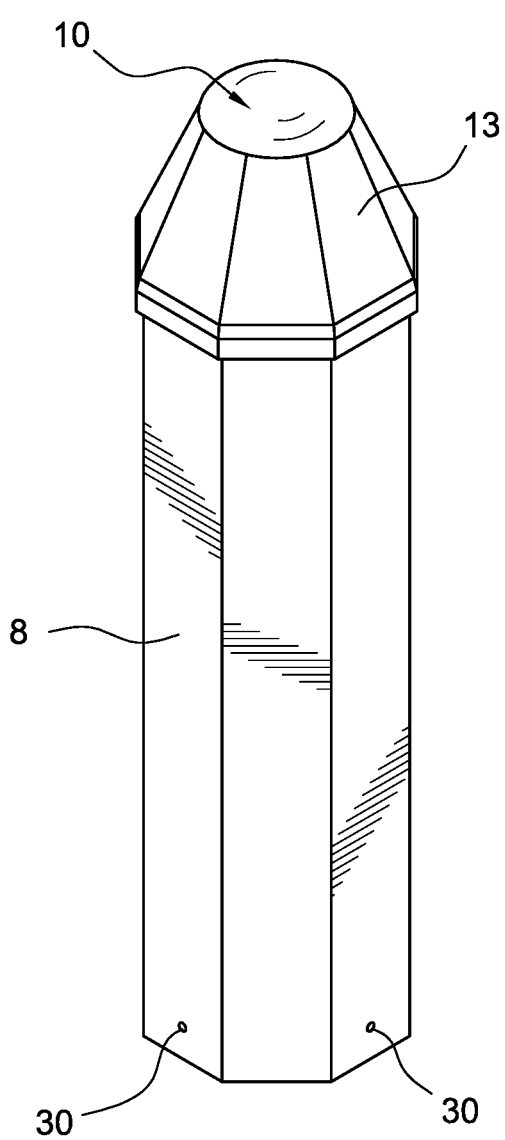
FIG. 2 is a perspective view of the bollard housing.
Figure 3:
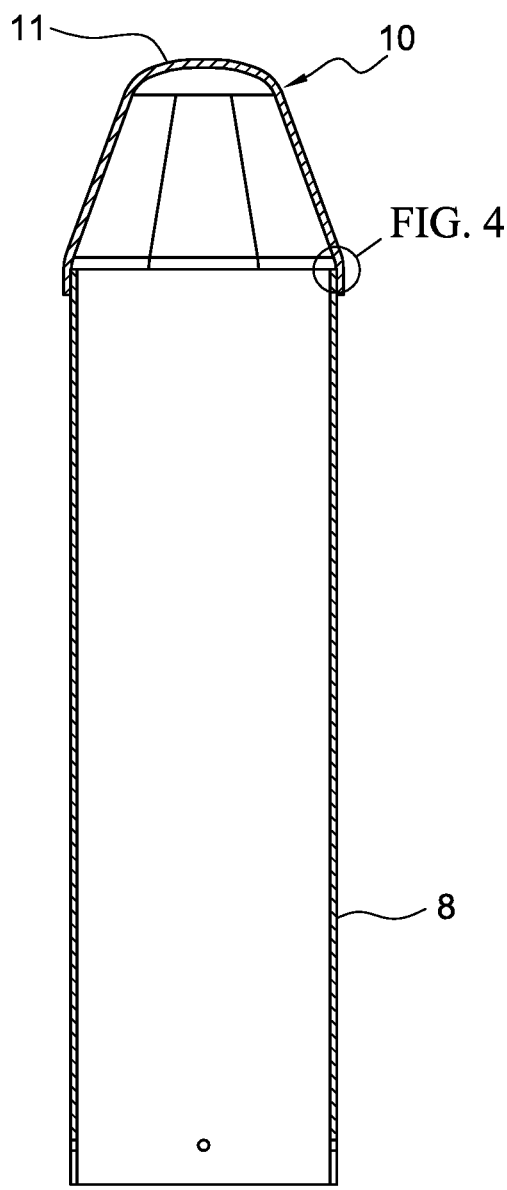
FIG. 3 is a cross-sectional view of the housing, with the internal frame not shown for clarity.
Figure 4:
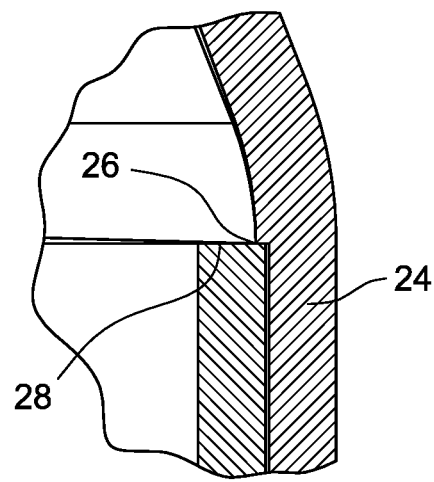
FIG. 4 is an enlarged view of a section from FIG. 3.

Referring to FIGS. 2-4, the tube 8 is preferably octagonal in cross-section, preferably made from pultruded fiberglass. The cap 10 is also octagonal in cross-section and dome-shaped, preferably made of polycarbonate. The cap 10 includes a lip portion 24 that overlaps an upper portion of the tube 8 to advantageously keep water from rain or sprinkler water from entering the housing 6. An internal shoulder 26 in the cap 10 sits on an upper edge 28 of the tube 8. The shoulder 26 advantageously provides a physical stop during assembly.

The cap 10 includes a convex circular top portion 11 and trapezoidal walls 13 that extend downwardly from the top portion 11 and the lip portion 24. The trapezoidal walls 13 are shown as being symmetrical but it can be asymmetrical. Other shapes for the cap 10 can be used.

The cap 10 is permanently bonded to the tube 8 with an epoxy or other standard fasteners during assembly. Holes 30 located at the lower portion of the tube 8, spaced 90 degrees apart, are used for the bolts 25 for attaching the tube 8 to the base plate 20. While the housing 6 is disclosed as being made of two pieces, the housing can also be made of one piece with the tube 8 being integral with the cap 10.

Figure 5:
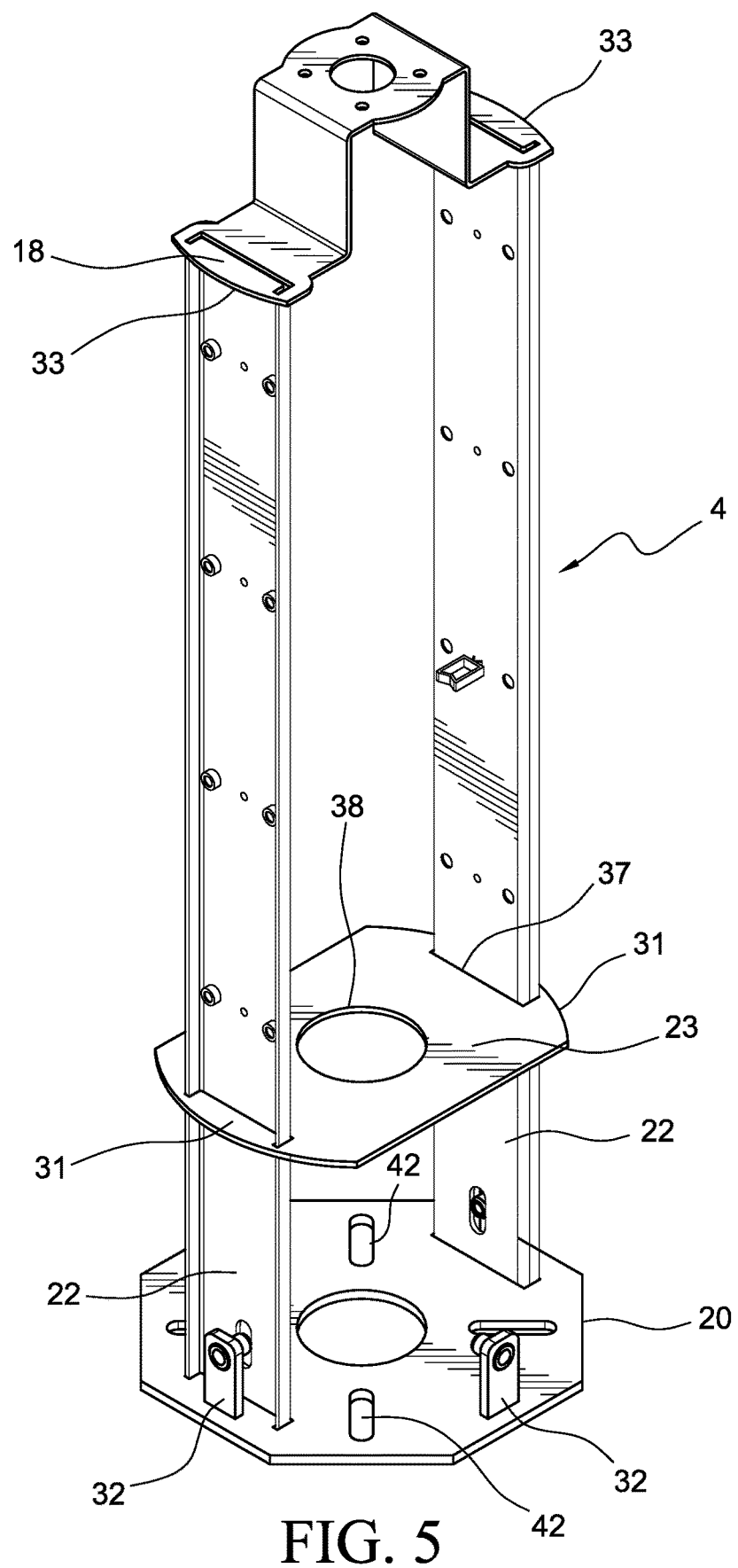
FIG. 5 is a perspective view of the internal frame shown in FIG. 1.

Referring to FIG. 5, the frame 4 is a welded aluminum internal frame, comprising of a pair of the vertical members 22, the base plate 20 and the antenna mounting bracket 18. A cross-section plate 23 may be used to brace and stabilize the vertical members 22, creating more stability and provides rigidity to the frame 4. The frame 4 is of one piece design, advantageously increasing the speed of assembly in the field and provides a rigid frame to mount equipment. The one piece configuration of the frame 4 also prevents the bollard from being tipped over if a force is applied to the top. The internal frame 4 is of sturdy construction intended to bear the load of any model of access point radio 12 and resists the force of a person leaning on the housing 6. The frame 4 also maximizes the internal space for mounting equipment with the use of two vertical members 22.

Figure 13:
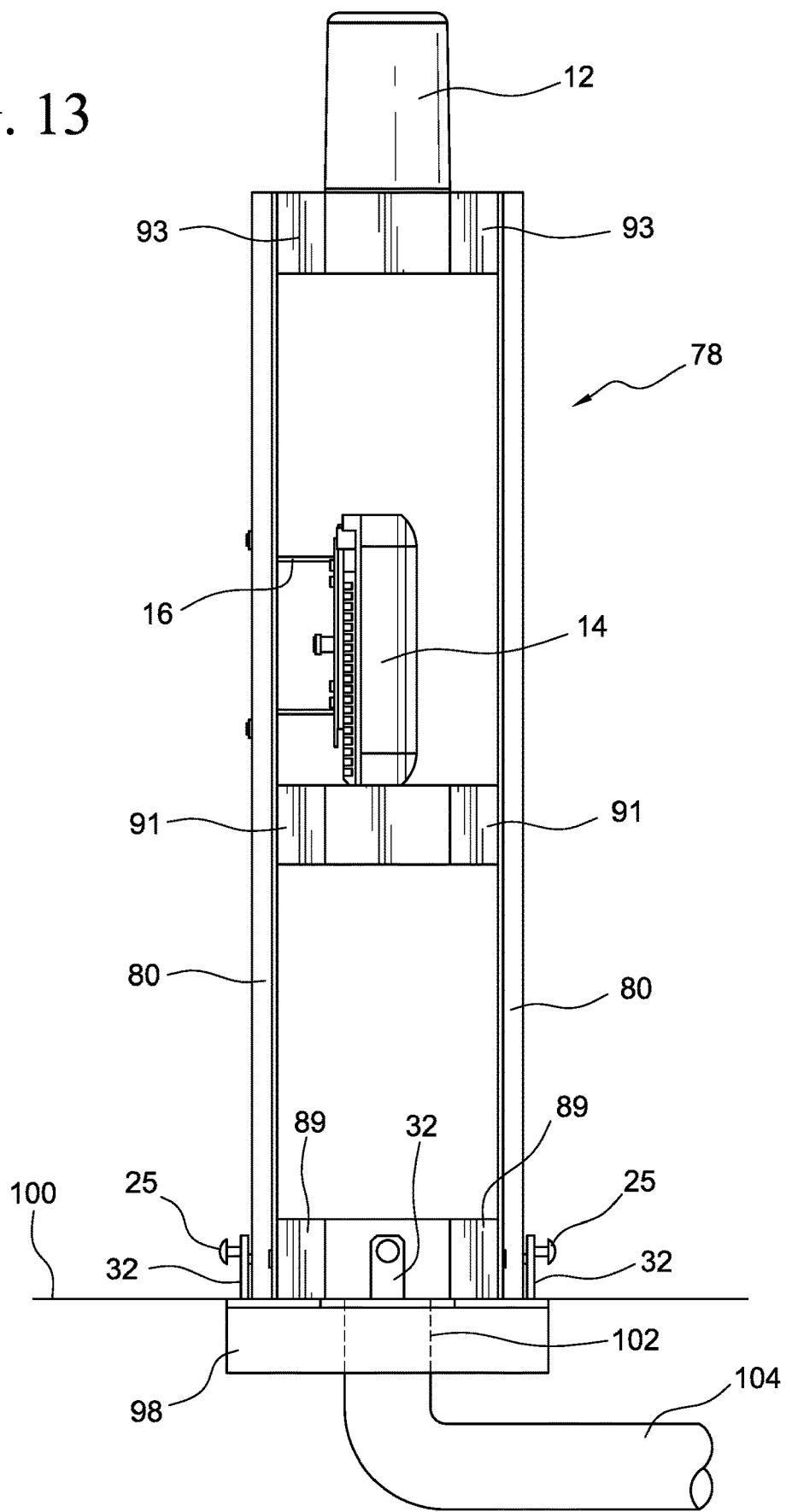
FIG. 13 is a side elevational view of FIG. 12.
Figure 14:
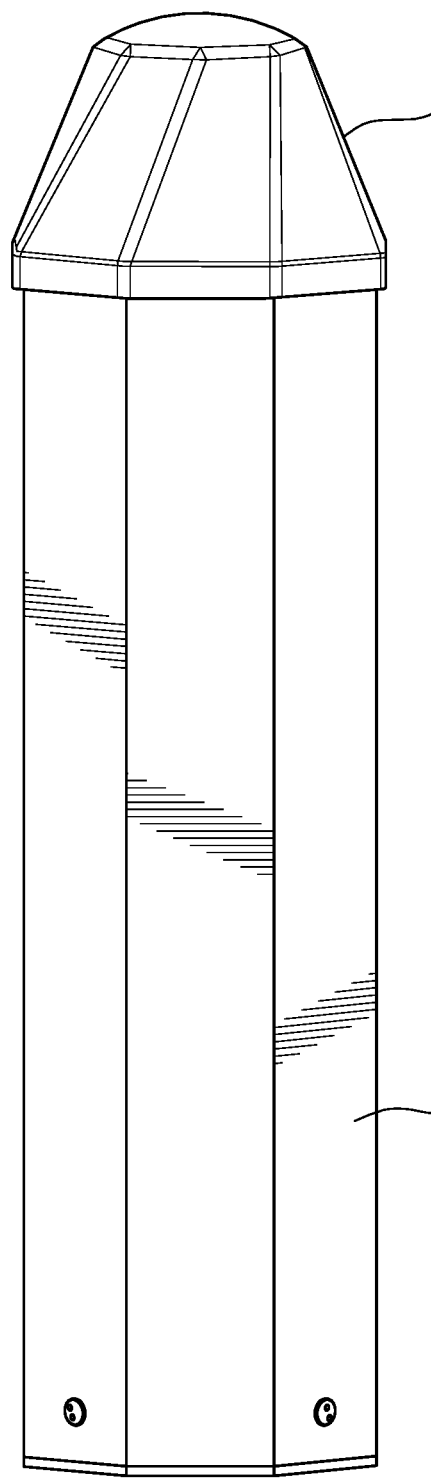
FIG. 14 is a perspective view of a bollard housing used in the present invention.
Figure 15:
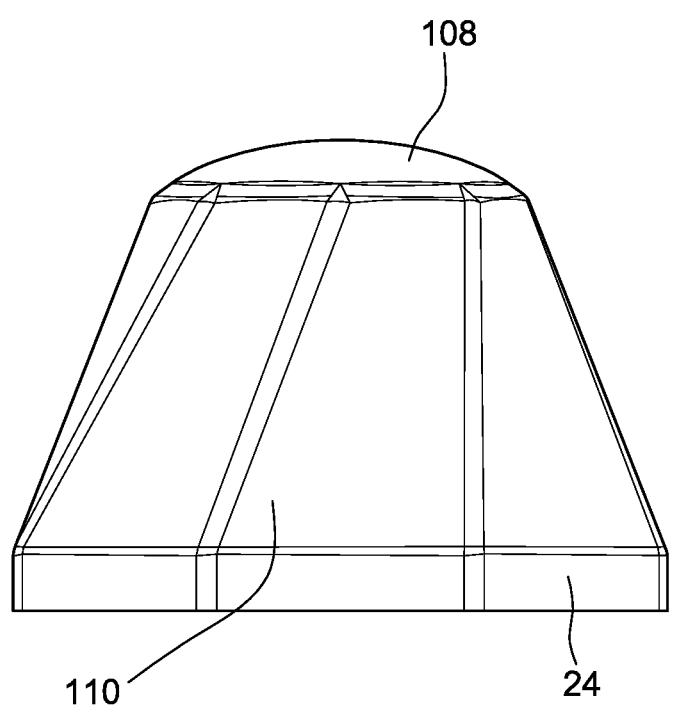
FIG. 15 is a side elevational view of the cap of the housing of FIG. 14.
Figure 16:
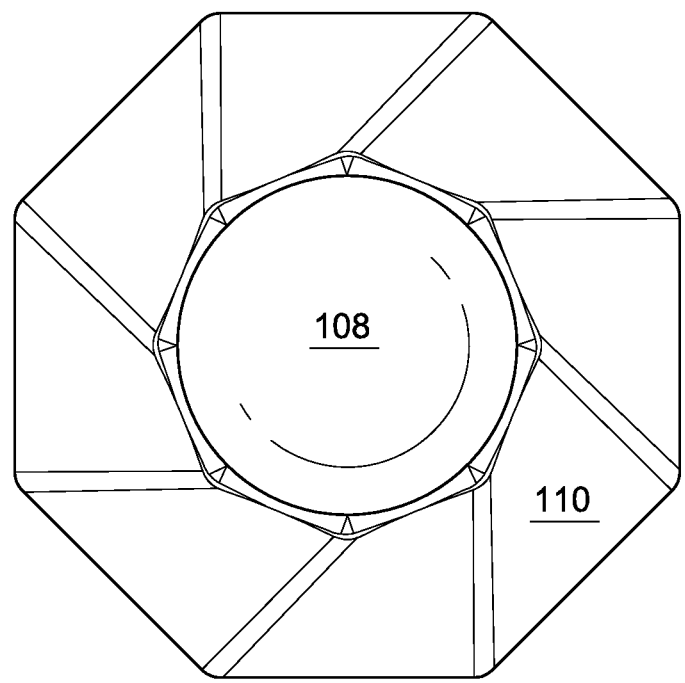
FIG. 16 is a top view of the cap of the housing of FIG. 14.
Figure 17:
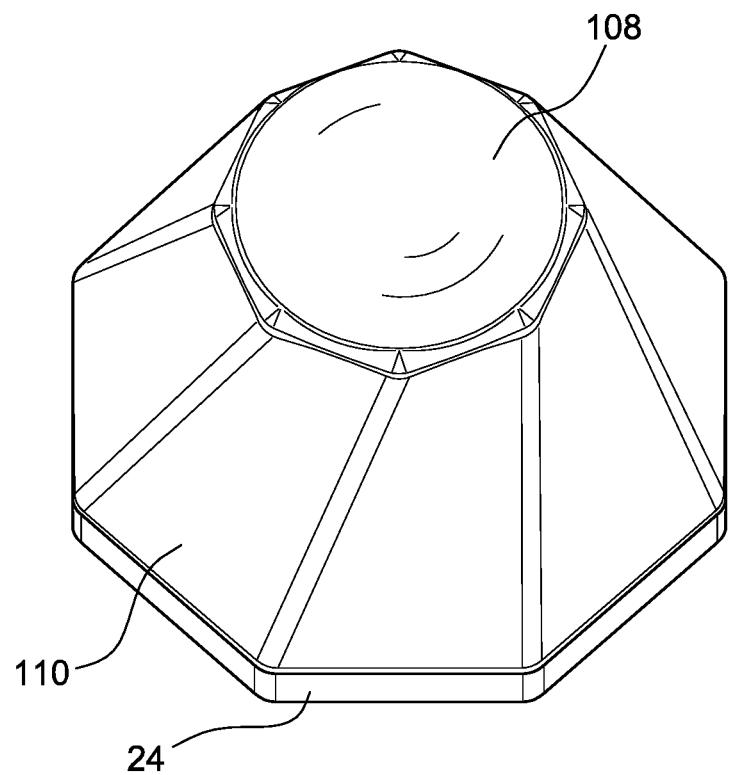
FIG. 17 is a top perspective view of the cap of the housing of FIG. 14.

The outer edges 31 of the cross-section plate 23 that engage the inner circular surface 29 of the tube 8 are shaped to conform to the circular shape of the surface 29 so that contact with the surface 29 is maximized. Similarly, the outer edges 33 of the mounting bracket 18 are shaped to conform to the circular shape of surface 29 so that contact with the surface 29 is maximized. In this manner, any transverse force that may be applied to the housing 6 will be resisted by the rigid frame 4, which is securely attached to the concrete foundation 98 (FIG. 13).

Openings 37 allow the respective vertical members 22 to pass through advantageously serve as fixtures during welding. The vertical members 22 are preferably C-channel shaped in cross-section. An opening 38 is used to route the cables from the access point radio 14 to the rest of the wired network.

Figure 6:
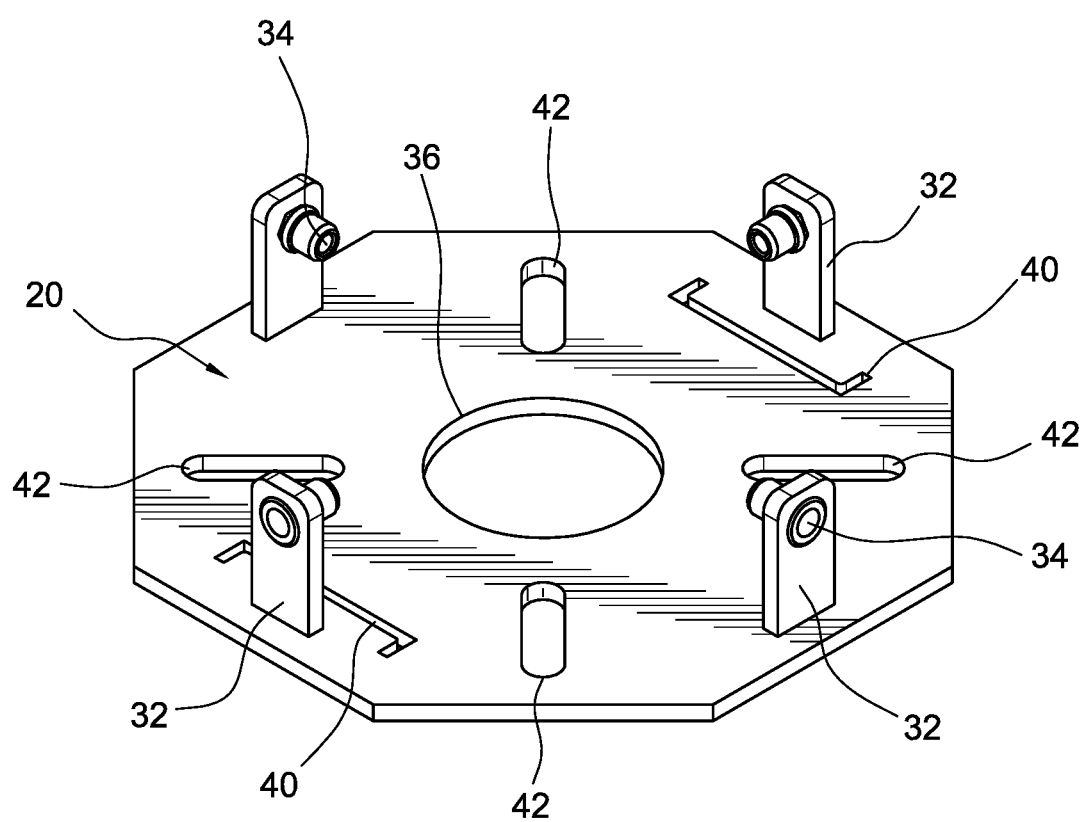
FIG. 6 is a perspective view of a base plate shown in FIG. 1.

Referring to FIG. 6, tabs 32 are attached to the base plate 20 by welding and extend perpendicularly upwardly. Nuts 34 are attached to the tabs 32. The nuts 34 are preferably pressed fit into openings in the tabs 32. The nuts 34 are preferably half-hex shank rivet nuts. The tabs 32 are preferably welded to the base plate 20. The base plate 20 is placed on a concrete foundation 98 (see FIG. 13) and is the only component in contact with the ground. An opening 36 is used to route the cables from the access point radio 14 to the rest of the wired network. Elongated openings 42 allow threaded studs (not shown) that extend upwardly from the concrete foundation 98 to pass through the plate 20 during mounting of the frame 4 to the foundation. Each of the openings 42 is advantageously positioned between any two of the tabs 32 for working clearance during mounting to the foundation. C-shaped openings 40 are used to receive the respective vertical members 22 prior to welding. The openings 40 facilitate the manufacturing of the frame by serving as fixtures during welding. The profile of the base plate 20 preferably matches flush with the hexagonal profile of the 8.

Referring to FIGS. 7-9, the members 22 are provided with openings 43 to allow the bolts 25 to pass through when fastened into the nuts 34 in the tabs 32. Holes 44 with nuts 46, preferably captive nuts, are disposed along the length of each member 22 on opposite edges. The nuts 46 are used to attach the mounting bracket 16. Holes 48 are provided between the holes 44 for attachment of cable clamps 50 which provide cable management inside the assembly. The holes 48 are advantageously provided along the vertical length of the members 22 to allow for multiple mounting options and flexibility in mounting the access point radio 14 to the vertical members 22.

Figure 10:
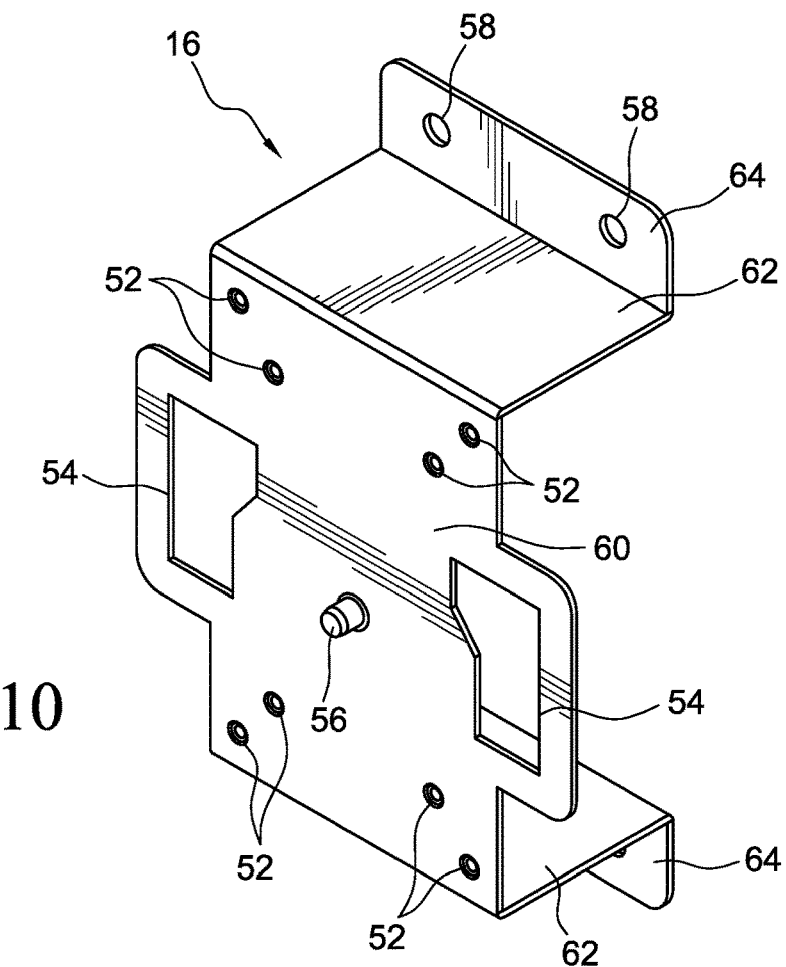
FIG. 10 is a perspective view of an access point radio mounting bracket shown in FIG. 1.

Referring to FIG. 10, the mounting bracket 16 for attaching the access point radio 14 to the frame 4 is shown in detail. The bracket 16 is formed as a U-shaped channel and contains holes 52 to accommodate popular access point radio models, such as the Cisco 3802e or the Cisco 15721C. Cutouts 54 and locating pin 56 are used for mounting a different access point radio model from another manufacturer. The holes 52 preferably include nuts pressed into the holes. Holes 58 are used to mount the bracket 16 to one of the vertical members 22 with bolts. The remaining threaded inserts are for additional equipment that may be required in the user's application. The mounting bracket 16 is specific to the model of the access point radio 14 used. A different configuration of the holes 52, the openings 54 and the pin 56 may be used, as appropriate, to accommodate a specific access point radio model from a manufacturer.

The bracket 16 is preferably U-shaped with a base portion 60 and leg portions 62 extending transversely, preferably perpendicularly, from the base portion 60. Flange portions 64 extend transversely outwardly, preferably perpendicularly, from the respective leg portions 62.

Figure 11:
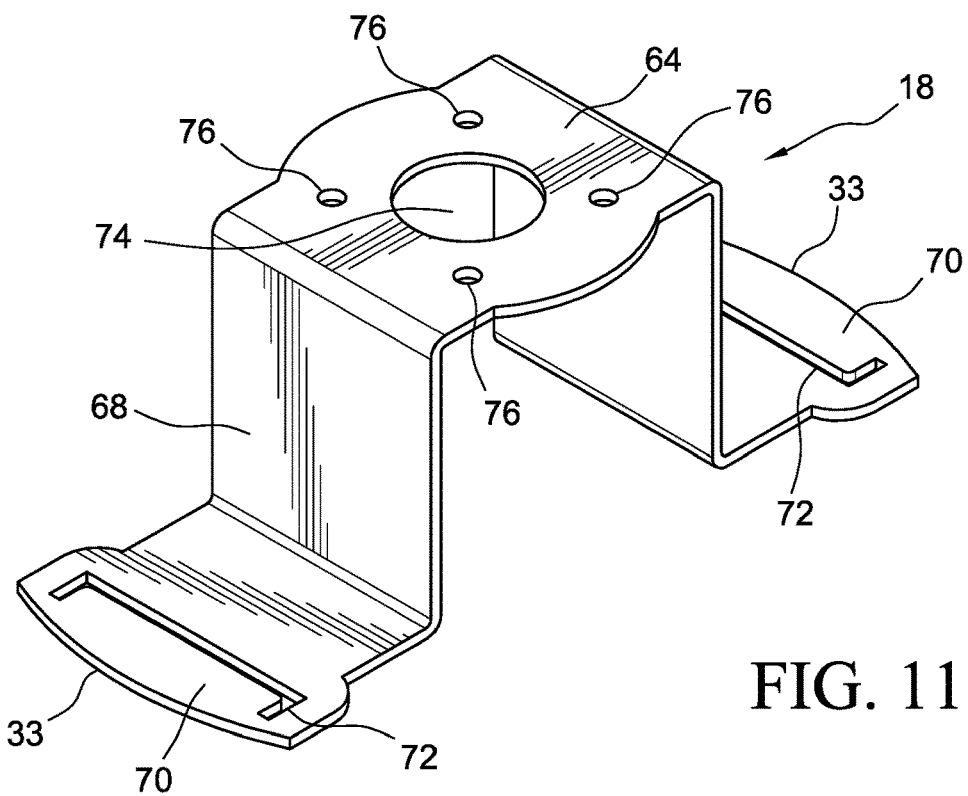
FIG. 11 is a perspective view of an antenna mounting bracket shown in FIG. 1.

Referring to FIG. 11, the antenna mounting bracket 18 is fabricated from sheet metal that is bent preferably into an inverted U-shape. The U-shape advantageously raises the antenna 12 above the frame 4, if made of metal, to eliminate the possibility of the metal structure interfering with the RF transmission. The bracket 18 is U-shaped with a base portion 66 and leg portions 68 extending transversely, preferably perpendicularly, from the base portion 66. Flange portions 70 extend transversely outwardly, preferably perpendicularly, from the respective leg portions 68. The flange portions 70 include openings 72, advantageously allowing the vertical members 22 to be located in and welded to the bracket. The openings 72 advantageously serve as fixtures during welding. The bracket 18 has a central hole 74 to route the wires of the antenna 12. Holes 76 around the central hole 74 allow the threaded studs of the antenna 12 to pass through. Other ways of attaching the antenna 12 to the bracket 18 may be used. For example, in some designs of the antennas 12, a large threaded stud passes through the central hole and a large nut can clamp the antenna to the bracket. In another version of the antenna, nuts can be fastened to each threaded stud to clamp the antenna to the bracket, and the holes serve the purpose of preventing rotation of the antenna.

Figure 12:
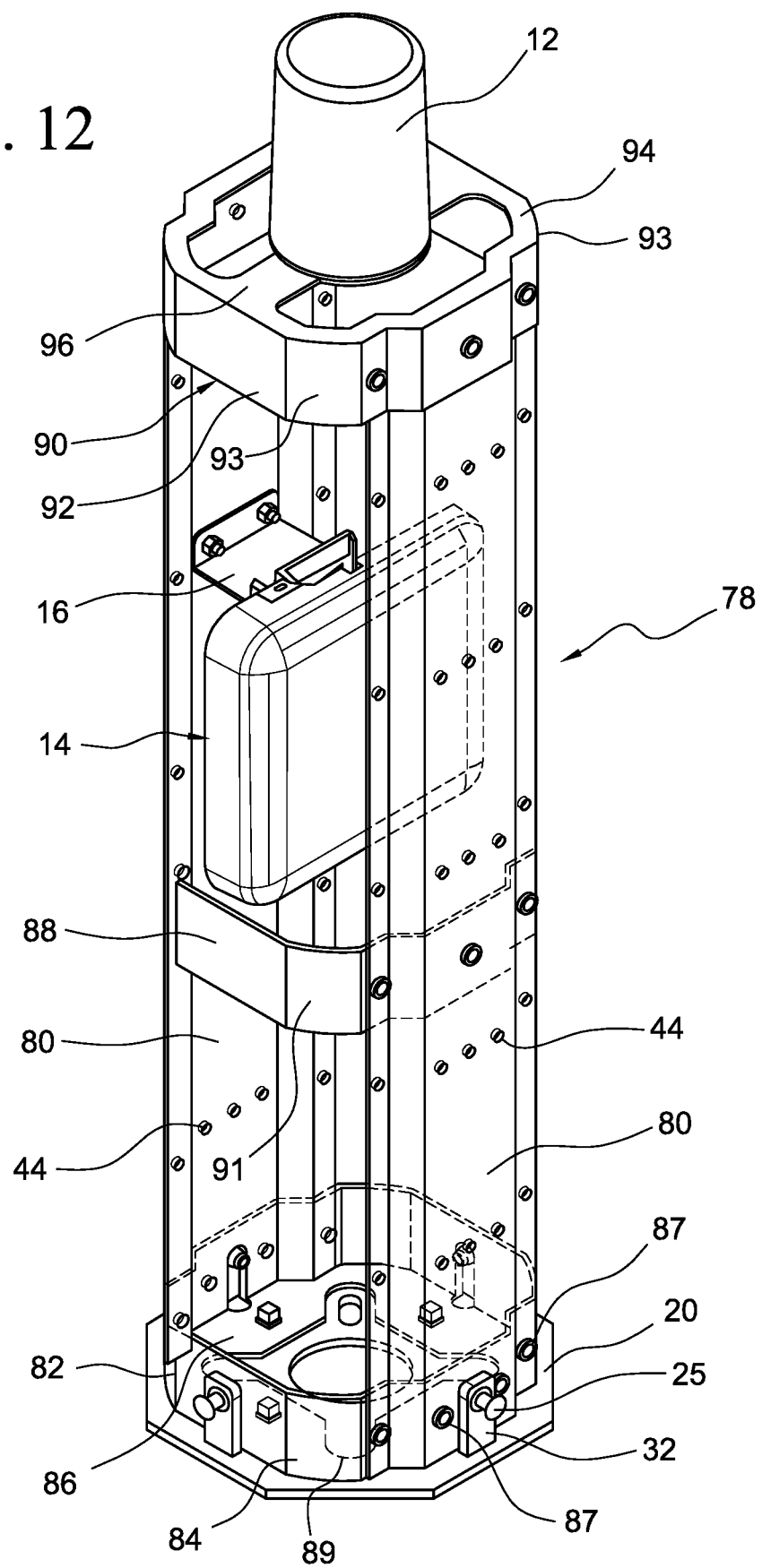
FIG. 12 is a perspective view of another embodiment of an internal frame embodying the present invention.

Referring to FIG. 12, another embodiment of the frame 4 is disclosed as frame 78 made of plastic, such as polycarbonate. The members 22 are replaced by members 80, preferably U-shaped. A base support 82 is attached to the base plate 20. The base support 82 has a circumferential vertical wall 84 attached to the bottom portions of the members 80 with standard fasteners 87, such as screws, snap rivets, etc. The base support 82 has flange portions 86 attached to the base plate 20 with standard fasteners, such as nuts and bolts. The wall 84 is preferably perpendicular to the flange portion 86. Curved wall portions 89 of the wall 84 conform to and engage the inner surface 29 of the housing 6 so that contact with the surface 29 is maximized to allow the frame 78 to effectively resist any inadvertent transverse force on the housing 6.

A brace 88 in the form of a sleeve or ring is attached to the members 80 with standard fasteners, such as screws, snap rivets, etc. Curved wall portions 91 of the sleeve 88 conform to and engage the inner surface 29 of the housing 6 so that contact with the surface 29 is maximized to allow the frame 78 to effectively resist any inadvertent transverse force on the housing 6.

Another brace 90 having a circumferential vertical wall 92 is attached to the upper end portions of the members 80 with standard fasteners, such as screws, snap rivets, etc. Flange portions 94 extend transversely, preferably perpendicularly, from the wall 92. A bridge portion 96 extends across the wall 92 for supporting the antenna 12. Curved wall portions 93 of the brace 90 conform to and engage the inner surface 29 of the housing 6 so that contact with the surface 29 is maximized to allow the frame 78 to effectively resist any inadvertent transverse force on the housing 6.

The frame 78 functions the same as the welded aluminum frame 4. The frame 78 is made into one piece, advantageously requiring no assembly in the field. The one piece construction and the contact between the inner surface 29 and the curved wall portions 89, 91 and 93 advantageously provides for a rigid structure able to withstand abuse from passers-by. The access point radio 12 is attached to the frame 78 with the aluminum bracket 16 that bolts to the frame. The access point radio bracket 16 will vary depending on the model of access point radio used.

Referring to FIG. 13, the frame 78 is shown attached to a concrete foundation 98 set into the ground 100. An opening 102 in the foundation 98 leads into a conduit 104 for routing the cables from the access point radio 14 to the wired network. Since the brace 88 is open, the bracket 16 can be positioned anywhere along the height of the frame 78. A larger access point radio 14 extending across the sleeve 88, with a similarly extending bracket 16 can also be accommodated. The longer bracket can be attached to any of the holes 44.

The frame 78 is advantageously made of plastic, such as polycarbonate, to allow access point radios with internal antennas, such as Cisco 1572IC, to be used. An access point radio with internal antenna is mounted in the center of the frame 78 and having no metal around it advantageously avoids any RF interference.

Referring to FIGS. 14-17, the frame 78 is enclosed in the tube 8 and a cap 106. The cap 106 has a convex and circular top portion 108 and asymmetrical trapezoidal wall portions 110 extending downwardly from the top portion 108 and the lip portion 24.

The present invention advantageously makes the bollard assembly 2 less susceptible to damage from accidental collisions as well as acts of vandalism and tampering, which are a significant concern for deployment in high traffic, public settings.

The internal frame 4, 78 of the bollard assembly 2 is advantageously made of sturdy construction intended to bear the load of any model of access point radio and resist the force of a person leaning on the post. The bollard assembly 2 also maximizes the internal space for mounting equipment with the two vertical C channel members 22, 80.

The use of captive nuts on the frames allow for a minimal amount of loose parts which saves time and effort in assembly and maintenance. It allows greater flexibility in mounting equipment.

The bollard assembly 2 provides cable management through the use of cable clamps 50 which can be attached to designated attachment points on the internal frame members 22, as well as routing holes 38 which are cut into the cross-section plate 23.

The cap 10, 106 is advantageously impact resistant and RF transparent.

Both the cap 10, 106 and the tube 8 are UV resistant, which will prevent the exterior from deteriorating in the outdoor environment.

The bollard assembly 2 advantageously provides a secure, weather resistant, and tamper resistant structure to contain an antenna, access point radio, power equipment, and other necessary hardware to provide wireless coverage in high traffic, outdoor public locations or in situations where other methods of deployment are not desirable. The modular nature of the frame 4, 78 as well as the abundance of internal space, can also lend flexibility for additional future design functions to be integrated, such as serving as a light fixture, as an example.

The bollard assembly can be adapted to various configurations through the placement of hardware brackets on the vertical members 22, which have sets of holes 44 and captive nuts 46 in spaced increments. The access point radio bracket 16 has been configured to accept popular access point radios from several manufacturers. The bracket 16 can be updated and modified to accept new or any other access point radio models. Additionally, the antenna mounting bracket 18 can be modified to accommodate other antenna models.

The entire bollard assembly 2 is secured to the concrete foundation 98 with concrete anchored studs that extend from the foundation and pass through the base plate 20 through the openings 42. The bollard tube 8 has the holes 30 near the ground, where the security bolts 25 with tamper resistant heads are inserted and threaded into the internal metal frame 4. During maintenance, the bolts 25 are removed and the bollard tube 8 can be slid up to expose the frame 4, 78.

All fasteners use thread into captive nuts, which eliminates the need for loose nut hardware. This facilitates the installation of Wi-Fi hardware as well as maintenance.

High strength, modular frame design allows great flexibility in housing wireless equipment.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An outdoor Wi-Fi bollard, comprising:
   a) a bollard housing having a vertical tube with a vertical wall and top and bottom openings and a cap disposed over the top opening;
   b) a base disposed at the bottom opening;
   c) first and second vertical members disposed inside the housing and extending adjacent the wall from the base to the top opening, the first and second vertical members including first and second bottom ends, respectively, operably attached to the base;
   d) a first brace disposed at the top opening, the first and second vertical members including first and second top ends, respectively, operably attached to the first brace; and
   e) an antenna operably mounted to the first brace, the antenna extending into the cap.

2. The outdoor Wi-Fi bollard as in claim 1, and further comprising an access point radio operably mounted to one of the first and second vertical members.

3. The outdoor Wi-Fi bollard as in claim 1, wherein:
   a) the base includes a plate; and
   b) the vertical members are welded to the plate.

4. The outdoor Wi-Fi bollard as in claim 3, wherein:
   a) the base includes upright tabs operably attached to the plate; and
   b) the vertical tube is operably attached to the tabs.

5. The outdoor Wi-Fi bollard as in claim 1, wherein:
   a) the base includes a vertical peripheral wall; and
   b) the first and second bottom ends of the respective first and second vertical members are operably attached to the peripheral wall.

6. The outdoor Wi-Fi bollard as in claim 5, wherein:
   a) the base includes a plate; and
   the base includes a flange operably attached to the vertical peripheral wall and the plate.

7. The outdoor Wi-Fi bollard as in claim 5, wherein portions of the vertical peripheral wall shaped to conform to and engage an inner surface of the vertical wall of the vertical tube.

8. The outdoor Wi-Fi bollard as in claim 1, and further comprising:
   a) a second brace disposed between the first brace and the base; and
   a) the second brace is operably attached to the first and second vertical members.

9. The outdoor Wi-Fi bollard as in claim 8, wherein the second brace includes a plate.

10. The outdoor Wi-Fi bollard as in claim 9, wherein the plate includes an outer portion shaped to conform to and engage an inner surface of the vertical wall of the vertical tube.

11. The outdoor Wi-Fi bollard as in claim 8, wherein the second brace includes a sleeve.

12. The outdoor Wi-Fi bollard as in claim 1, wherein the first vertical member is disposed diametrically opposite the second vertical member with respect to the base.

13. The outdoor Wi-Fi bollard as in claim 1, wherein the first and second vertical members are U-shaped in cross-section.

14. The outdoor Wi-Fi bollard as in claim 1, wherein:
   a) the first brace is U-shaped having a base portion and leg portions extending from the base portion; and
   b) the antenna is operably attached to the base portion.

15. The outdoor Wi-Fi bollard as in claim 1, and further comprising:
   a) a U-shaped mounting bracket having a base portion and leg portions;
   b) the leg portions are attached to one of the first and second vertical members; and
   c) an access point radio is operably attached to the base portion.

16. The outdoor Wi-Fi bollard as in claim 1, wherein the antenna is omnidirectional.

17. The outdoor Wi-fi bollard as in claim 1, wherein the first brace includes outer portions shaped to conform to and engage an inner surface of the vertical wall.

18. The outdoor Wi-Fi bollard as in claim 1, wherein:
   a) the first brace includes a vertical peripheral wall; and
   b) portions of the vertical peripheral wall are shaped to conform to and engage an inner surface of the vertical wall of the vertical tube.

19. An outdoor Wi-Fi bollard, comprising:
   a) a bollard housing having a vertical tube with a vertical wall and top and bottom openings and a cap disposed over the top opening;
   b) a base disposed at the bottom opening, the base including a first peripheral vertical wall;
   c) first and second vertical members disposed inside the housing and extending adjacent the vertical wall from the base to the top opening, the first and second vertical members including first and second bottom end portions, respectively, operably attached to the peripheral vertical wall;
   d) a brace disposed at the top opening, the brace including a second peripheral vertical wall, the first and second vertical members including first and second top end portions, respectively, operably attached to the second peripheral vertical wall; and
   e) an antenna operably attached to the brace.

20. An outdoor Wi-Fi bollard, comprising:
   a) a bollard housing having a vertical tube portion with a vertical wall and a top end and a bottom end and a cap portion at the top end;
   b) a frame disposed inside the bollard housing;
   c) the frame including a base for attachment to a foundation, first and second U-shaped vertical members extending adjacent the vertical wall from the base to the top end of the tube portion, and a brace operably attached to first and second top end portions of the first and second U-shaped vertical members, respectively;
   d) the brace including an outer portion shaped to conform to and engage an inner surface of the vertical wall so that a side force applied to the housing is transferred to the frame; and
   e) an antenna operably attached to the brace.

* * * * *